3,194,798
CYANOETHYLATION OF POLYVINYL ALCOHOL
Lawrence W. Frost, Murrysville, Pa., assignor to Westinghouse Electric Corporation, East Pittsburgh, Pa., a corporation of Pennsylvania
No Drawing. Filed May 9, 1962, Ser. No. 193,613
5 Claims. (Cl. 260—91.3)

This invention relates to the cyanoethylation of polyvinyl alcohol and, more particularly, to an improved method of cyanoethylation which consistently produces a clear and light-colored product of high purity suitable for use in electroluminescent devices.

The reaction of polyvinyl alcohol with acrylonitrile under suitable conditions gives a resinous product in which all or a portion of the hydroxyl groups of the original polymer have been replaced by cyanoethoxy groups. The product so produced is useful, for example, as a film, an adhesive and a dielectric material. It is particularly efficacious in electrical applications because of its high dielectric constant, making it valuable as insulation in capacitors and as a vehicle for suspending the phosphor in electroluminescent devices. Most applications do not require a colorless product. However, for electroluminescent devices a clear and very light colored product is desirable. Any light absorption by a colored resin would result in a corresponding reduction in light output and increase in heat production by the lamp. The cyanoethylated polyvinyl alcohol may be employed in the electroluminescent lamp structure disclosed and claimed in application Serial No. 138,158, assigned to the assignee of this invention.

Numerous methods of preparing cyanoethylated polyvinyl alcohol have been described in the literature. The most generally useful of these is the method described by R. C. Houtz in U.S. Patent No. 2,341,553, in which sodium hydroxide is used as a catalyst.

One problem inherent in the cyanoethylation procedure is that homopolymerization of the acrylonitrile occurs concurrently with the desired reaction. Fortunately, the homopolymer is less soluble in the reaction mixture than is the cyanoethylated product. Although some contamination is difficult to avoid, the homopolymer can be removed fairly well by filtration. Since the homopolymerization represents a loss of starting material, it will be apparent that it is desirable to have the cyanoethylation reaction proceed at a rate much higher than that of the homopolymerization.

Another problem which is frequently encountered in the method described in U.S. Patent No. 2,341,553 is that a yellow to orange color develops in the mixture as the reaction proceeds and this color remains in the final product. The color can be minimized by careful attention to purity and reaction conditions, but the results are nonetheless erratic. A highly cyanoethylated product prepared by employing commercial materials in the foregoing method is almost always yellow to orange colored.

Accordingly, it is an object of this invention to provide a method for the cyanoethylation of polyvinyl alcohol which produces a colorless or very light-colored product of high purity suitable for use in electroluminescent devices.

Another object of this invention is to provide a method for the cyanoethylation of polyvinyl alcohol in which the rate of cyanoethylation is markedly increased as compared to the rate of homopolymerization of the acrylonitrile.

Further objects and advantages of the invention will become apparent as the following description proceeds and features of novelty which characterize the invention will be pointed out in particularity in the claims annexed to and forming a part of this specification.

The surprising discovery has now been made that the addition of ammonium hydroxide to a preparation otherwise similar to the method described in U.S. Patent No. 2,341,553 markedly increases the rate of cyanoethylation as compared to the rate of homopolymerization of the acrylonitrile. This procedure also greatly reduces the rate of formation of the yellow color, even when commercial starting materials are used without purification. A colorless or very light-colored product of high purity is easily obtained. This product is especially suitable for use in electroluminescent devices with the advantages of increased light output and decreased heat production.

The amount of ammonium hydroxide used is not critical. An amount of 29% ammonium hydroxide solution equal to from about 0.1 to about 10% of the weight of acrylonitrile may be suitably employed. The ammonium hydroxide reacts rapidly with a portion of the acrylonitrile, giving a small amount of white precipitate. This precipitate is largely one or more of the compounds 2-cyanoethylamine, bis(2-cyanoethyl)amine and tris(2-cyanoethyl)amine.

In order to illustrate the effect of the presence of ammonium hydroxide on the cyanoethylation reaction and the product produced therefrom, the cyanoethylation reaction was conducted without and with varying amounts of ammonium hydroxide as outlined hereinbelow.

EXAMPLE I

A mixture of 13.5 grams of granulated polyvinyl alcohol (having a viscosity of 4–6 centipoises as a 4% water solution at 20° C.) and 240 grams of acrylonitrile was stirred while 3 ml. of 1% sodium hydroxide solution and 3 ml. of 5% sodium hydroxide solution were added. The mixture was then heated to reflux, and refluxed with stirring while observations of color and clarity of product were made.

EXAMPLE II

A mixture of 13.5 grams of granulated polyvinyl alcohol (having a viscosity of 4–6 centipoises as a 4% water solution at 20° C.) and 240 grams of acrylonitrile was stirred while 1 ml. of a 29% ammonium hydroxide solution was added, followed immediately by 3 ml. of 1% of sodium hydroxide solution and 3 ml. of 5% sodium hydroxide solution. The mixture was then heated to reflux, and refluxed with stirring while observations of color and clarity were made.

EXAMPLE III

A mixture of 13.5 grams of granulated polyvinyl alcohol (having a viscosity of 4–6 centipoises as a 4% water solution at 20° C.) and 240 grams of acrylonitrile was stirred while 3 ml. of a 29% ammonium hydroxide solution was added, followed immediately by 3 ml. of 1% sodium hydroxide solution and 3 ml. of 5% sodium hydroxide solution. The mixture was then heated to reflux, and refluxed with stirring while observations of color and clarity of product were made.

EXAMPLE IV

A mixture of 13.5 grams of granulated polyvinyl alcohol (having a viscosity of 4–6 centipoises as a 4% water solution at 20° C.) and 240 grams of acrylonitrile was stirred while 9 ml. of a 29% ammonium hydroxide solution was added, followed immediately by 3 ml. of 1% sodium hydroxide solution and 3 ml. of 5% sodium hydroxide solution. The mixture was then heated to reflux and refluxed with stirring, while observations of color and clarity of product were made.

In the preparation of the foregoing examples, the extent of reaction is conveniently estimated by the clarity of the reaction mixture. At the outset, the polyvinyl alcohol is suspended in the liquid acrylonitrile to give a milky-looking mixture. As the reaction proceeds, the mixture becomes clear because of the higher solubility of the cyanoethylated product in acrylonitrile. If the reaction is continued beyond this point, the homopolymer of acrylonitrile begins to be formed in significant amounts and precipitates, giving a turbid suspension again. Throughout the reaction, a small amount of the ammonium hydroxide-acrylonitrile reaction product remains suspended, but it is in curdy chunks which do not interfere with observations of the ultimate clarity or color of the product. The following table indicates the results observed during the preparation of the foregoing examples.

Table I.—Effect of $NH_4OH$ on reaction rate and clarity of product

| Example No. | Ml. $NH_4OH$ solution added | Time, minutes | | |
|---|---|---|---|---|
| | | Clear | Yellow | Orange |
| 1 | 0 | 15 | 15 | 30 |
| 2 | 1 | 10 | 10 | 45 |
| 3 | 3 | 8 | 65 | 80 |
| 4 | 9 | 5 | 100 | 120 |

It is apparent from the results shown in Table I that increasing the amount of ammonium hydroxide decreases the time required for the reaction to progress far enough to give a clear solution. It is also apparent from that table that the formation of a yellow or orange color is greatly retarded by increasing the ammonium hydroxide content.

The following examples demonstrate the use of other grades of polyvinyl alcohol in the cyanoethylation process.

EXAMPLE V

A mixture of 2400 grams of acrylonitrile and 270 grams of granulated polyvinyl alcohol (having a viscosity of 28–32 centipoises as a 4% water solution at 20° C.) was stirred while 200 ml. of 29% ammonium hydroxide was slowly added. A curdy white precipitate formed. Fifty milliliters of 3% sodium hydroxide solution was then added and the mixture was heated to reflux with continued stirring. After 38 minutes of reflux, a clear colorless solution was obtained with lumps of the original precipitate suspended in it. A light yellow color developed in about 100 minutes and a slight turbidity in about 150 minutes. At this point, the solution was cooled to room temperature, filtered and precipitated by pouring it into 50% ethanol. The gummy precipitate was washed with water, dissolved in acetone, precipitated by pouring into water, washed again with water, dissolved in acetone and recovered by evaporation of the acetone under vacuum. A tough white resin was obtained.

EXAMPLE VI

A mixture of 240 grams of acrylonitrile and 27 grams of a granulated polyvinyl alcohol (having a viscosity of 55–56 centipoises as a 4% water solution at 20° C.) was stirred while 10 ml. of 29% ammonium hydroxide was added, followed by 5 ml. of 3% sodium hydroxide. The mixture was heated to reflux and refluxed with stirring. It became clear and colorless after 30 minutes of reflux, although the original precipitate with ammonia remained undissolved. A pale yellow color began to develop in 60 minutes, and it slowly deepened to orange in 210 minutes. A slight turbidity also developed in 210 minutes and increased during the next 30 minutes. The run was discontinued after 240 minutes. Samples were removed and worked up as described in the preparation of Example V at various times during the run. They were tough, white to pale yellow resins up to 150 minutes of reflux. Beyond that time, yellow to light orange products were obtained.

It will be apparent that except for the addition of ammonium hydroxide, the method of this invention is similar to that described by Houtz in U.S. Patent No. 2,341,553. The alkaline catalysts and solvents disclosed by Houtz can be successfully employed in the method of this invention. It should be understood that although sodium hydroxide is preferred other alkali metal hydroxides, alkaline earth metal hydroxides, quaternary ammonium bases, alkaline salts such as alkali metal cyanides, carbonates, acetates, and other alkali salts of weak acids may be successfully employed in this invention.

A small amount of an alkaline catalyst may be employed. For example, solutions containing 0.5 to 20% by weight of alkali metal hydroxide are suitable, but the invention is not restricted to any particular alkali concentration.

It will be understood that according to this invention, ammonium hydroxide is employed in combination with the foregoing alkali catalysts. As mentioned hereinabove, this invention is not restricted to any particular ammonium hydroxide concentration. Moreover, it will be understood that this invention contemplates the addition of the reaction product resulting from the addition of ammonium hydroxide to acrylonitrile. It is, of course, preferable to simply add the ammounium hydroxide to the reaction mixture.

An excess of acrylonitrile is preferably employed as a solvent for the product produced by the cyanoethylation of the polyvinyl alcohol. Other solvent materials may be added or employed as, for example, acetone; a low molecular weight fatty acid ester, such as metal acetate; or a polyether, for example, dioxane.

While there have been shown and described what are at present considered to be the preferred embodiments of the invention, modifications thereto will readily occur to those skilled in the art. It is not desired, therefore, that the invention be limited to the specific methods described and it is intended to cover in the appended claims all such modifications as fall within the true spirit and scope of this invention.

I claim as my invention:

1. A process for cyanoethylating a polyvinyl alcohol comprising the steps of (1) admixing polyvinyl alcohol and acrylonitrile, (2) adding thereto an aqueous catalyzing solution of ammonium hydroxide containing about 0.1 to about 10% by weight of ammonium hydroxide based on the weight of the acrylonitrile, (3) adding thereto a catalyzing amount of a strong alkali having a strength at least comparable to alkaline-earth metal hydroxides, and (4) heating said admixture thereby rapidly producing a substantially colorless cyanoethylated polyvinyl alcohol.

2. A process for cyanoethylating a polyvinyl alcohol comprising the steps of (1) admixing polyvinyl alcohol and acrylonitrile, (2) adding thereto an aqueous catalyzing solution of ammonium hydroxide containing about 0.1 to about 10% by weight of ammonium hydroxide based on the weight of the acrylonitrile, (3) adding thereto a catalyzing amount of a strong alkali selected from the group consisting of alkali metal hydroxides, alkaline-earth metal hydroxides, quaternary ammonium bases, and alkali salts of weak acids, said strong alkali being an aqueous solution containing about 0.5–20% of alkali, and (4) heating said admixture thereby rapidly producing a substantially colorless cyanoethylated polyvinyl alcohol.

3. The process of claim 2 wherein said strong alkali is an alkali metal hydroxide.

4. In the process of preparing cyanoethylated polyvinyl alcohol by admixing and heating granulated polyvinyl alcohol and acrylonitrile, the improvement comprising the steps of (1) catalyzing said reaction by adding to the admixture an aqueous solution of ammonium hydroxide in an amount of about 0.1 to about 10% by weight of ammonium hydroxide based on the weight of the acrylonitrile, (2) thereafter adding to the admixture a catalyzing amount of a strong alkali selected from the group consisting of alkali metal hydroxides, alkaline-earth metal hydroxides, quaternary ammonium bases, and alkali salts of weak acids, said strong alkali being employed as a 0.5 to 20% solution, thereby rapidly producing a substantially colorless cyanoethylated polyvinyl alcohol.

5. The process of claim 4 in which said strong alkali is an alkali metal hydroxide.

References Cited by the Examiner
UNITED STATES PATENTS

| | | | |
|---|---|---|---|
| 2,341,553 | 2/44 | Houtz | 260—91.3 |
| 2,941,990 | 6/60 | Schuller | 260—73 |

WILLIAM H. SHORT, *Primary Examiner.*

LOUISE P. QUAST, *Examiner.*